United States Patent
Lee et al.

(10) Patent No.: US 7,310,863 B2
(45) Date of Patent: Dec. 25, 2007

(54) DE-BURRING APPARATUS FOR A HOBBING MACHINE

(75) Inventors: Jeffrey R. Lee, Tipton, MI (US); Frank H. Kays, Brighton, MI (US); Travis M. Thompson, Ann Arbor, MI (US); Stephen D. Doubler, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/619,752

(22) Filed: Jan. 4, 2007

(65) Prior Publication Data

US 2007/0186398 A1    Aug. 16, 2007

Related U.S. Application Data

(60) Provisional application No. 60/772,049, filed on Feb. 10, 2006.

(51) Int. Cl.
    *B23P 23/00* (2006.01)
    *B23F 19/10* (2006.01)
    *B23F 19/12* (2006.01)
    *B23F 5/24* (2006.01)

(52) U.S. Cl. ............ 29/56.5; 409/8; 409/11; 451/900; 451/69

(58) Field of Classification Search ............ 29/56.5, 29/566, 33 A; 409/8, 11, 38, 40, 50, 55; 451/47, 65, 67, 69, 161, 253, 900
See application file for complete search history.

(56) References Cited

U.S. PATENT DOCUMENTS

| | | | | |
|---|---|---|---|---|
| 2,206,443 A | * | 7/1940 | Barter et al. | 409/8 |
| 2,278,300 A | * | 3/1942 | Barter et al. | 409/8 |
| 2,451,447 A | * | 10/1948 | Ransome | 409/8 |
| 3,129,638 A | * | 4/1964 | Husby | 409/8 |
| 3,130,642 A | * | 4/1964 | Kulesh et al. | 409/8 |
| 6,079,090 A | * | 6/2000 | Ongaro | 29/27 C |
| 6,757,949 B2 | * | 7/2004 | Fitzgerald et al. | 29/56.5 |
| 6,839,953 B2 | * | 1/2005 | Fitzgerald et al. | 29/558 |
| 6,939,093 B2 | * | 9/2005 | Arvin et al. | 409/12 |
| 7,103,973 B2 | * | 9/2006 | Wolff et al. | 29/893.35 |
| 2004/0109735 A1 | * | 6/2004 | Arvin et al. | 409/12 |

FOREIGN PATENT DOCUMENTS

DE    10249039 B4 * 5/2004
JP    62-034720 A * 2/1987

\* cited by examiner

*Primary Examiner*—Erica Cadugan

(57) ABSTRACT

The present invention provides a hobbing machine. The hobbing machine includes a clamp fixture adapted to retain a gear blank. A motor is operatively connected to the clamp fixture and is configured to rotate the clamp fixture and the gear blank together at a predetermined speed. A rotatable cutter is translatable into engagement with the gear blank and is configured to cut the gear blank and thereby produce a plurality of gear teeth. A de-burring tool is translatable into engagement with the gear blank and is configured to remove burrs from the gear blank as the gear teeth are being cut. A motorized spindle is operatively connected to the de-burring tool, and is configured to power and rotate the de-burring tool at a predefined speed to optimize the removal of the burrs.

12 Claims, 4 Drawing Sheets

DE-BURRING APPARATUS FOR A HOBBING MACHINE

CROSS REFERENCE TO RELATED APPLICATIONS

This application claims the benefit of United States Provisional Patent Application No. 60/772,049, filed Feb. 10, 2006, and which is hereby incorporated by reference in its entirety.

TECHNICAL FIELD

The present invention pertains generally to machine tools and, more particularly, to a de-burring apparatus for a hobbing machine used for cutting gear and spline profiles.

BACKGROUND OF THE INVENTION

A hobbing machine is a specialized form of milling machine that may be used to mill gear teeth into a gear blank and thereby produce a gear member or a splined member. The hobbing machine generates a gear member by synchronously rotating a gear blank and a cutter or bob tool as the hob tool is brought into engagement with the gear blank. The hob tool can produce a burr on the gear member when the gear teeth are being cut. The burr is preferably removed by a de-burring tool to improve the performance of the gear member. In the present art, de-burring in hobbing machines is accomplished by a sharp edge tool such as a steel disk that removes burrs via the shearing action at the intersection of the steel disk and the gear blank. This conventional type of de-burring is not well suited for gear blank work pieces with raised thrust faces or complex edge chamfer designs. In these cases, additional processing steps are required for complete burr removal, additional processing such as chamfering machines, abrasive/wire wheel machines, shot blasting, and abrasive slurry de-burring as examples.

Therefore, a need exists for a hobbing machine de-burring apparatus that can effectively de-burr a gear blank work piece having raised thrust faces or complex chamfer designs without the need to incur the cost of additional processing steps outlined above.

SUMMARY OF THE INVENTION

The hobbing machine of the present invention includes a clamp fixture adapted to retain a gear blank. A motor is operatively connected to the clamp fixture and is configured to rotate the clamp fixture and the gear blank together at a predetermined speed. A rotatable cutter is translatable into engagement with the gear blank and is configured to cut the gear blank and thereby produce a plurality of gear teeth. A de-burring tool is translatable into engagement with the gear blank and is configured to remove burrs from the gear blank as the gear teeth are being cut. To optimize the removal of burrs on helical gears, the direction of rotation of the de-burring tool is selected to rotate in a direction that causes the deburring tool to rotate into the acute side of the gear profile of the gear blank. To facilitate this, a motorized spindle is operatively connected to the de-burring tool, and is configured to driveably rotate the de-burring tool at a user selected predefined speed and direction so as to optimize the removal of burrs from the gear blank.

The de-burring tool may include a peripheral edge sharpened to shear off and thereby remove the burrs.

The de-burring tool may include a contact surface configured to grind off and thereby remove the burrs.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
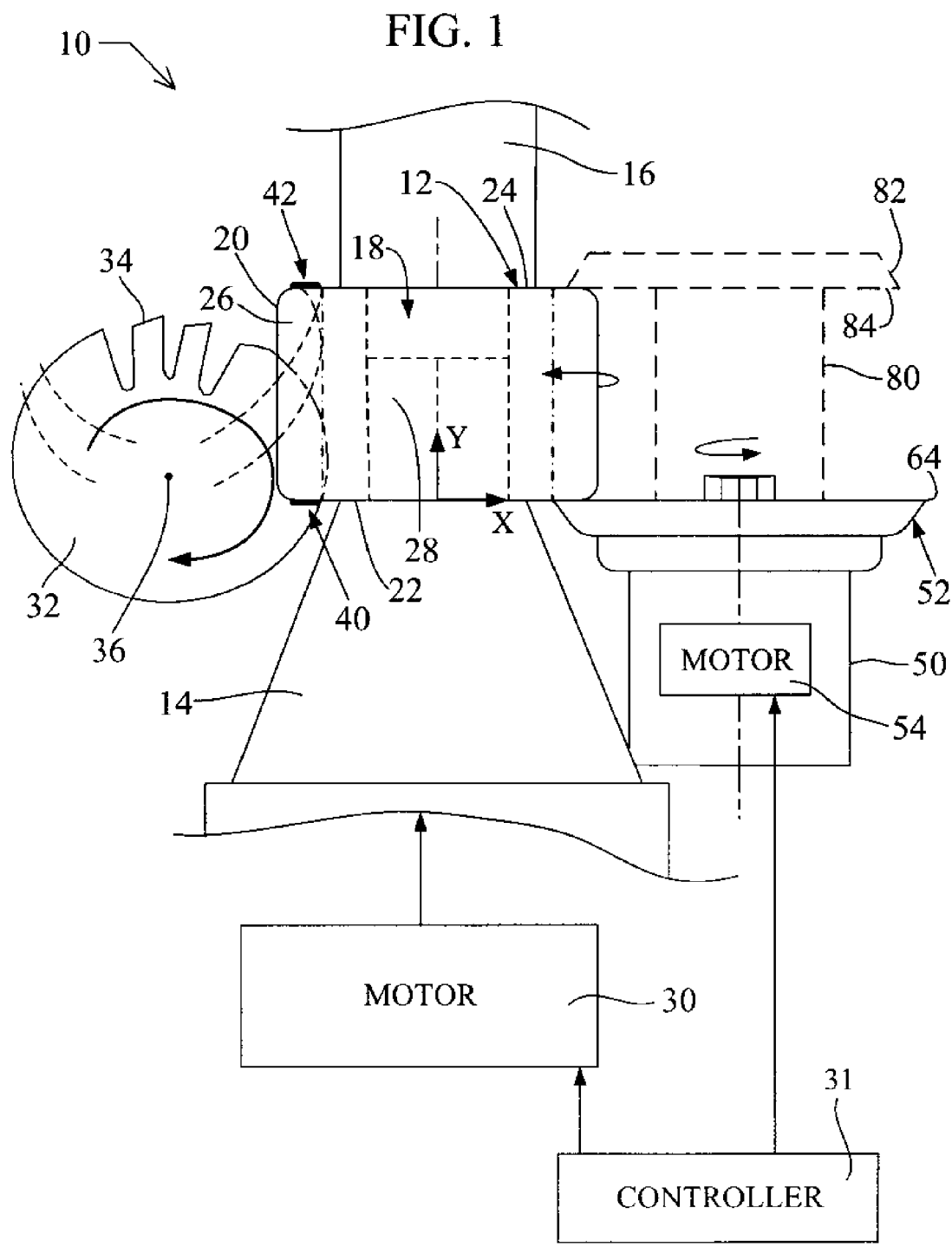
FIG. 1 is a schematic side illustration of a hobbing machine in accordance with the present invention.

Referring to the drawings wherein like characters represent the same or corresponding parts through the several views, there is shown in FIG. 1 a schematic representation of a vertical hobbing machine 10 in accordance with the present invention. It should be appreciated that the vertical hobbing machine 10 is shown for illustrative purposes and the present invention may be implemented with alternate hobbing machine configurations such as, for example, a horizontal hobbing machine. The hobbing machine 10 preferably retains a work piece or gear blank 12 between a clamp fixture 14 and a tailstock 16. The gear blank 12 defines a central aperture 18 and an outer diameter 20, and includes a bottom end surface 22 and a top end surface 24. As the gear blank 12 is machined, a plurality of gear teeth 26 are formed on the outer diameter 20. For illustrative purposes, the gear teeth 26 are shown as being helical; however, it should be appreciated that alternate gear tooth configurations such as spur gears may be envisioned.

The clamp fixture 14 includes a protrusion 28 that is insertable into the aperture 18 of the gear blank 12 to locate and retain the gear blank 12. The tailstock 16 is retracted away from the clamp fixture 14 to allow the gear blank 12 to be loaded onto the clamp fixture 14. The gear blank 12 is then loaded onto the clamp fixture 14 so that the protrusion 28 is inserted into the aperture 18. Thereafter, the tailstock 16 is translated in the negative Y direction into engagement with the gear blank 12 such that the gear blank 12 is seated onto the clamp fixture 14, and the gear blank 12 is securely retained between the tailstock 16 and the clamp fixture 14. A motor 30 spins the clamp fixture 14 such that the clamp fixture 14, the gear blank 12, and the tailstock 16 rotate together at a predetermined rate typically producing a surface speed in the range of 7-8 M/m relative to a stationary object. A controller 31 controls the output of the motor 30 such that the rate at which the gear blank 12 rotates is programmable.

The hobbing machine 10 includes a generally cylindrical hob tool or cutter 32 having a plurality of teeth 34 and a centerline 36. The cutter 32 is rotatable about its centerline 36 and is translatable in both the X and Y directions under power from the motor 30 or from a separate motor (not shown). After the gear blank 12 is loaded onto the clamp fixture 14 in the manner described hereinabove, the cutter is translated in the X direction into engagement with a bottom portion of the gear blank 12 (near the bottom end surface 22) and then up in the positive Y direction thereby cutting the outer diameter 20 of the gear blank 12 to produce a plurality of gear teeth 26. As is well known in the art, the rotational speeds of the cutter 32 and the gear blank 12 are synchronized by the controller 31 to produce a predefined gear tooth configuration.

When the gear teeth 26 are being cut, the cutter 32 can produce a burr 40 near the bottom end surface 22 of a gear tooth 26 and/or a burr 42 near the top end surface 24 of a gear tooth 26. Conventional de-burring tools consist of a tool having a sharp edge designed to shear off such burrs. The conventional de-burring tool is generally affixed to a non-powered spindle and is configured to rotate under the influence of a drag force imparted by the gear blank. As the surface speed of the rotating gear blank is generally relatively low (i.e., approximately 7-8 Meters/minute or M/m), the relative speed at which the cutting edge of a conventional de-burring tool engages a burr is also low. This type of de-burring typically leaves burrs up to 0.25 mm large on the gear teeth which require additional processing for more complete removal.

It has been observed that a relative surface speed of approximately 60 M/m between the de-burring tool and the burr is optimal for burr removal using a shearing action. Additionally, by providing a variable relative surface speed, the de-burring action is not limited to the more conventional shearing action. As an example. de-burring tools incorporating a grinding action or a milling action may be implemented instead of or in addition to a shearing action. The hobbing machine 10 therefore includes a motorized spindle or support 50 having a de-burring tool 52 as will be described in detail hereinafter.

The motorized spindle 50 is preferably operatively connected to a motor 54 configured to rotate the spindle 50 and the de-burring tool 52 mounted thereto. Alternatively, the motorized spindle 50 may be powered by the motor 30. The spindle 50 is also translatable in the X and Y directions. The controller 31 controls the motor 54 such that the rate of spindle rotation and the translation of the spindle 50 are programmable. The spindle 50 is preferably translated into the engaged position shown in FIG. 1 while the cutter 32 is cutting the gear teeth 26 such that the de-burring tool 52 comes into contact with the gear blank 12 and can remove any burrs (e.g., burr 40) therefrom. The rate (or speed) and direction at which the de-burring tool 52 is rotated is programmable via the controller 31 and may be selected to optimize the removal of burrs. The optimal rotational speed of the de-burring tool 52 is dependent on the specific type of tool implemented as will be described in detail hereinafter.

Figure 2:
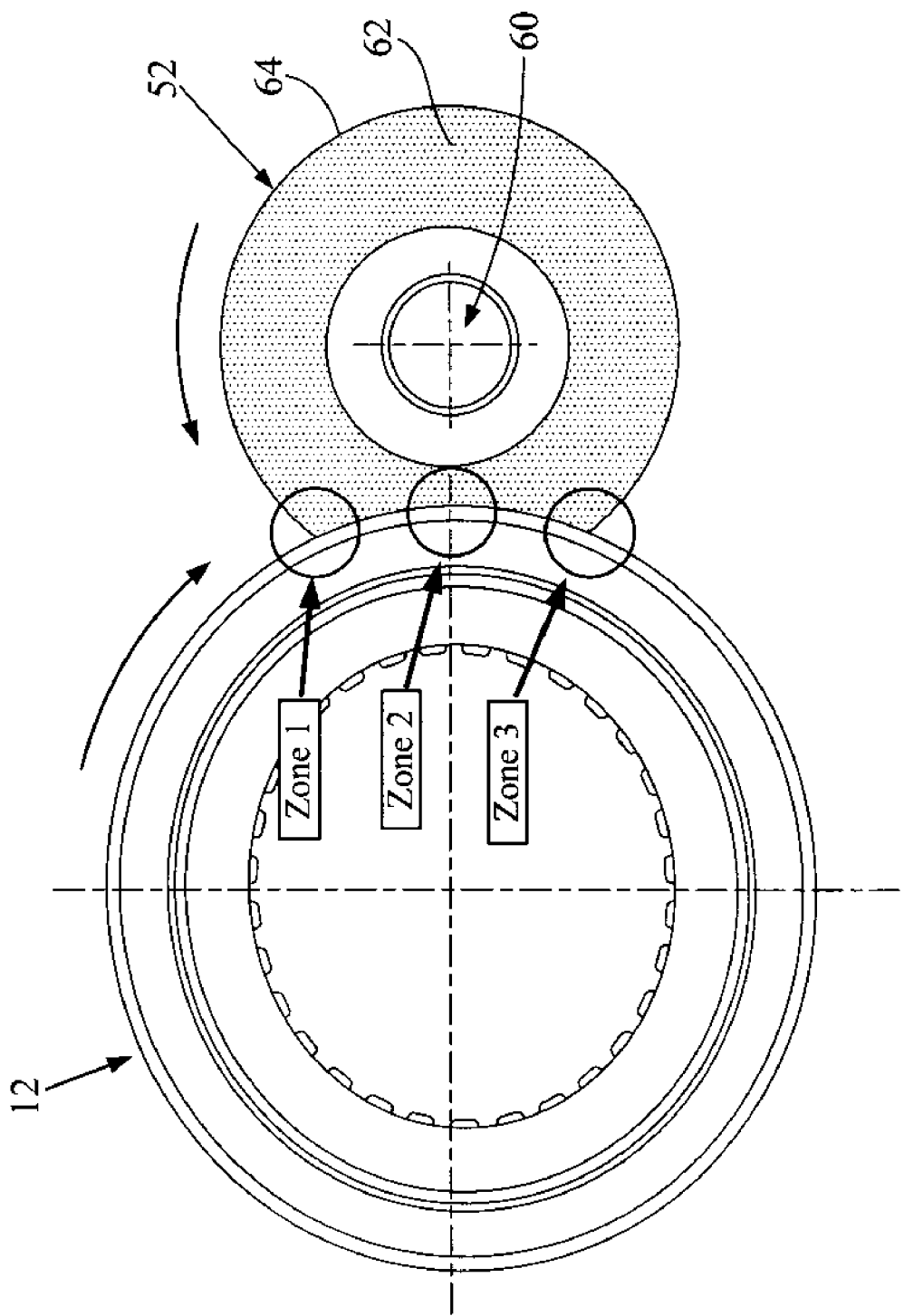
FIG. 2 is a schematic plan view of a gear blank engaged with a de-burring tool.

Referring to FIG. 2, a plan view of the de-burring tool 52 engaged with the gear blank 12 is shown. The de-burring tool 52 is generally circular and defines a central aperture 60 through which the de-burring tool 52 is mounted to the spindle 50 (shown in FIG. 1). The de-burring tool 52 includes an annular contact surface 62 configured to engage the gear blank 12 and remove any burrs (e.g., burr 40) therefrom. The composition of the contact surface 62 may be selected to meet the needs of a particular application and may depend, for example, on the gear blank material and/or the maximum allowable burr size. The motorized spindle 50 and rotably driven de-burring tool 52 apparatus of the present disclosure can effectively de-burr gear blanks with raised thrust faces or complex chamfer designs without the need for additional processing operations.

Exemplary contact surface 62 compositions may include high speed steel (HSS), carbide, or abrasive compositions such as aluminum oxide or cubic boron nitride (CBN). As previously indicated, the optimal rotational speed of the de-burring tool 52 is dependent on the specific type of tool implemented. It has been observed that a de-burring tool 52 having a contact surface 62 composed of HSS optimally removes burrs at a surface speed of 60 M/m. Similarly, the optimal surface speed for a carbide composition is 150 M/m, for a grinding material composition the optimal surface speed is 1,200 M/m, and for a CBN composition the optimal surface speed is 2,700 M/m. Alternatively, the contact surface 62 may be formed to include serrations or teeth adapted to cut any burrs.

In addition to the grinding or cutting of burrs performed by the contact surface 62, the de-burring tool 52 may include a peripheral edge 64 that has been sharpened to facilitate the removal of burrs. The peripheral edge 64 removes burrs using a shearing action, but is more effective because the relative speed at which the edge 64 engages a burr can be much faster than previously possible. Also, in some applications, the shearing action of the peripheral edge 64 may compliment the grinding or milling action of the contact surface 62 to further optimize burr removal. According to an alternate embodiment, the peripheral edge 64 can be rounded to match a chamfer or steps (not shown) in the gear blank 12.

As shown in FIG. 2, three zones (Zone 1, Zone 2 and Zone 3) are highlighted to show a sequence of steps during which a burr is removed from an individual gear tooth. Zones 1, 2 and 3 are shown in more detail in FIGS. 3A-3C and will be described in detail hereinafter.

Figures 3A, 3B, 3C:
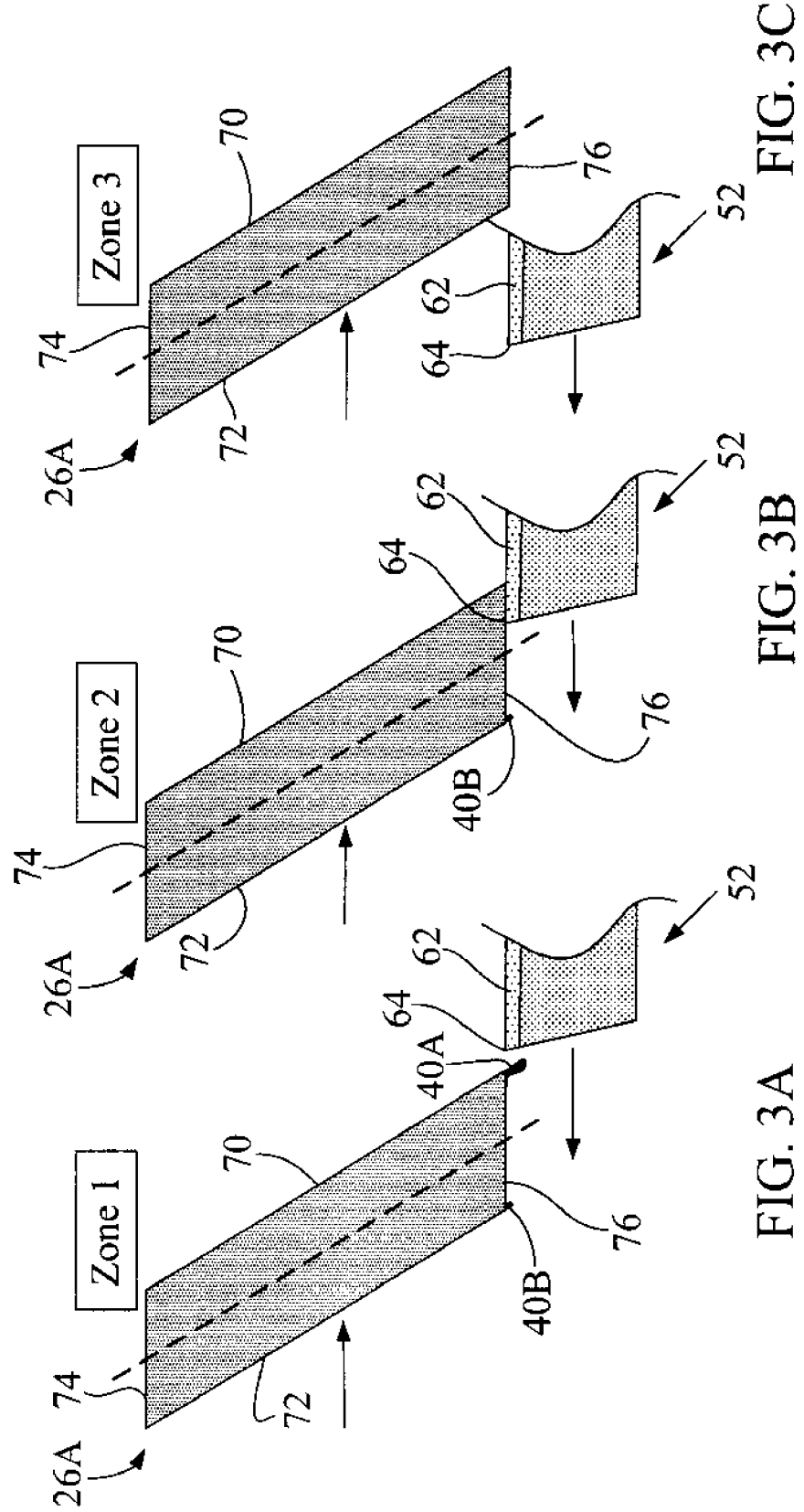
FIG. 3A is a schematic sectional view of a gear tooth just prior to engagement with a de-burring tool.
FIG. 3B is a schematic sectional view of a gear tooth as it is engaged by a de-burring tool.
FIG. 3C is a schematic sectional view of a gear tooth after it is engaged by a de-burring tool.

Referring to FIG. 3A, a sectional view of zone 1 is shown. More precisely, zone 1 shows a sectional view of a gear tooth portion 26A just prior to engagement by the de-burring tool 52. The gear tooth portion 26A includes an acute side or flank 70, an obtuse side or flank 72, a top end surface 74 and a bottom end surface 76. The gear tooth portion 26A also includes a relatively larger burr 40A and a relatively smaller burr 40B formed as the tooth 26 (shown in FIG. 1) was cut by the cutter 32 (shown in FIG. 1). As is known in the art, the larger burr 40A generally forms on the acute side 70 of the tooth 26, and the smaller burr 40B generally forms on the obtuse side 72 of the tooth 26. The de-burring tool 52 is shown with a sharpened peripheral edge 64 and is configured to remove the burrs 40A and 40B with a shearing action during engagement with the peripheral edge 64, and with a potentially complimentary grinding or milling action during engagement with the contact surface 62. Alternatively, the peripheral edge 64 may be rounded or blunted if only the contact surface 62 is being implemented to remove the burrs 40A and 40B.

Referring to FIG. 3B, a sectional view of zone 2 is shown. More precisely, zone 2 shows a sectional view of a gear tooth portion 26A after the de-burring tool 52 has engaged the acute side 70 of the tooth portion 26A but before the de-burring tool 60 engages the obtuse side 72 of the tooth portion 26A. It can be seen that the burr 40A has been removed by the engagement of the peripheral edge 64 and the contact surface 62 in the manner described hereinabove.

Referring to FIG. 3C, a sectional view of zone 3 is shown. More precisely, zone 3 shows a sectional view of a gear tooth portion 26A after the de-burring tool 52 has passed by both the acute side 70 and the obtuse side 72 of the tooth portion 26A. It can be seen that the burrs 40A and 40B have been removed by the engagement of the peripheral edge 64 and the contact surface 62 in the manner described hereinabove.

Referring again to FIG. 1, according to an alternate embodiment the spindle 50 may be adapted to remove burrs from the top end surface 24 of the gear blank 12 as well as from the bottom end surface 22. The spindle 50 therefore also includes a spacer 80 and a second de-burring tool 82. The spacer 80 is adapted to position the second de-burring tool 82 a predetermined distance above the de-burring tool 52 such that the de-burring tools 52, 82 can respectively engage the bottom end surface 22 and the top end surface 24 of the gear blank 12. The second de-burring tool 82 is similar to the de-burring tool 52, but includes a contact surface 84 that faces downward to engage the top end surface 24 of the gear blank 12. According to yet another alternate embodiment, a separate motor driven spindle (not shown) similar to the spindle 50 can be implemented to drive the second de-burring tool 82.

Figure 4:
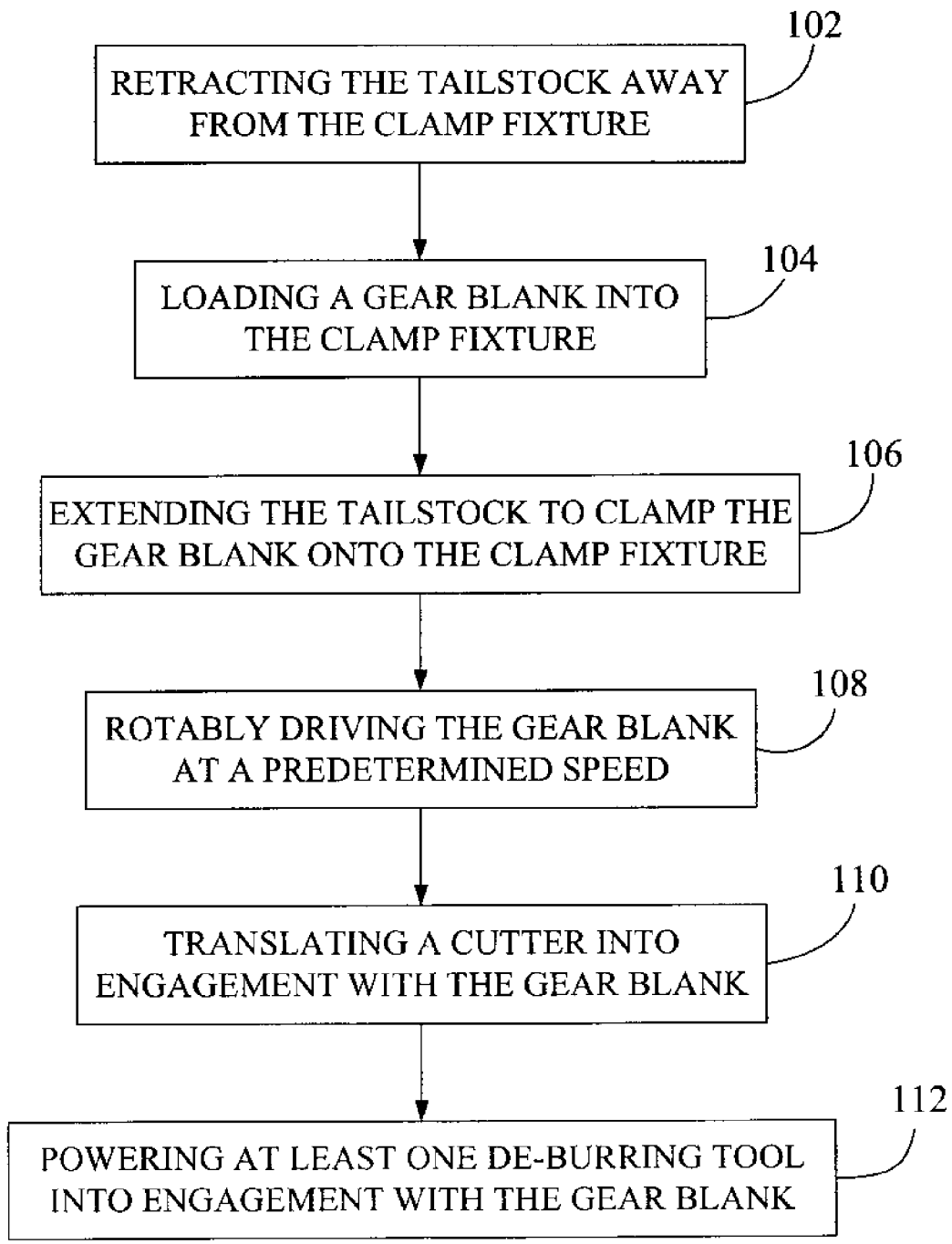
FIG. 4 is a method of de-burring a gear blank on a hobbing machine while cutting gear teeth into the gear blank in accordance with this invention.

The method steps described herein before are recapped in FIG. 4 which illustrates a method of de-burring a gear blank on a hobbing machine while cutting gear teeth into the gear blank. The method begins at step 102 by retracting the tailstock 16 away from the clamp fixture 14. At step 104 the gear blank 12 is loaded into the clamp fixture. At block 106 the tailstock 16 is extended outwards to clamp the gear blank 12 into the clamp fixture 14. At step 108 the motor 30 spins the clamp fixture 14 to rotably drive the gear blank 12 at a predetermined speed. At block 10 the bob tool or cutter 32 is translated into engagement with the gear blank 12 to cut the outer diameter of the gear blank to form gear teeth, the cutting process also producing burrs on the end surfaces of the gear blank. At block 112 a de-burring tool speed of rotation and a direction of rotation is selected, the speed and direction selected to optimize burr removal. At block 114 at least one motorized or otherwise powered de-burring tool (52 or 82) is brought into engagement with the gear blank 12 to remove burrs from at least one end surface (22 or 24) of the gear blank 12.

While the best modes for carrying out the invention have been described in detail, those familiar with the art to which this invention relates will recognize various alternative designs and embodiments for practicing the invention within the scope of the appended claims.

The invention claimed is:

1. A hobbing machine comprising:
   a rotatable clamp fixture adapted to retain a gear blank;
   a rotatable cutter translatable into engagement with the gear blank, said cutter configured to cut the gear blank and thereby produce a plurality of gear teeth and potentially burrs;
   a first rotatable de-burring tool translatable into engagement with a first end surface of the gear blank, said de-burring tool configured to remove said burrs from the first end surface of the gear blank as the gear teeth are being cut by the rotatable cutter;
   and a powered spindle driveably connected to said de-burring tool and operable to rotate said de-burring tool at a predefined speed and direction, the speed and direction selected to facilitate the removal of the burrs, and
   wherein the de-burring tool includes a peripheral edge sharpened to shear off and thereby remove some of said burrs, the de-burring tool also including a contact surface configured to grind off and thereby remove others of said burrs.

2. The hobbing machine of claim 1, wherein the sharpened peripheral edge is adjacent to the contact surface.

3. The hobbing machine of claim 1, wherein the contact surface may include compositions of high speed steel, carbide, or abrasive compositions.

4. The hobbing machine of claim 3, wherein the abrasive compositions include aluminum oxide or cubic boron nitride.

5. The hobbing machine of claim 1, further comprising a motor to power said powered spindle.

6. The hobbing machine of claim 1, including:
   a first motor operatively connected to the clamp fixture to rotate the clamp fixture and the gear blank at a predetermined speed; and
   a second motor to power said de-burring tool spindle.

7. The hobbing machine of claim 6 further including a controller controlling output of said second motor, wherein the predefined speed and direction of said de-burring tool spindle is programmable through said controller.

8. The hobbing machine of claim 7, wherein said de-burring tool spindle is translatable between two or more positions including a first disengaged position with respect to said first end surface and a second engaged position with respect to said first end surface and wherein position translation is programmable through the controller.

9. The hobbing machine of claim 8 further comprising:
   a second de-burring tool translatable into engagement with a second end surface of the gear blank, said second de-burring tool configured to remove burrs from the second end surface of the gear blank as the gear teeth are being cut by the rotatable cutter; and
   a spacer adapted to position said second de-burring tool at a predetermined distance from the first de-burring tool, said spacer secured at one end to said powered spindle, said spacer secured at an opposing second end to said second de-burring tool so as to rotate said second de-burring tool in unison with said first de-burring tool, the predetermined distance of said spacer selected such that said second de-burring tool engages the second end surface of the gear blank while said first de-burring tool engages the first end surface to remove burrs from the first end surface and the second end surface of the gear blank.

10. The hobbing machine of claim 8 further comprising:
    a second de-burring tool translatable into engagement with a second end surface of the gear blank, said second de-burring tool configured to remove burrs from the second end surface of the gear blank; and
    said second de-burring tool configured to rotate at a predefined speed and direction, the speed and direction selected to facilitate removal of burrs, wherein said predefined rotary speed of said second de-burring tool spindle is programmable through said controller.

11. A hobbing machine for cutting gear teeth into a gear blank, comprising:
    a rotatable clamp fixture adapted to retain the gear blank;
    a first motor operatively connected to the clamp fixture to rotate the clamp fixture and the gear blank at a predetermined speed;
    a rotatable cutter translatable into engagement with the gear blank, said cutter configured to cut the gear blank and thereby produce plurality of gear teeth and potentially burrs;
    a first rotatable de-burring tool translatable into engagement with a first end surface of the gear blank, said de-burring tool configured to remove said burrs from the first end surface of the gear blank as the gear teeth are being cut by the rotatable cutter;

a powered spindle driveably connected to said de-burring tool and operable to rotate said de-burring tool at a predefined speed and direction, the speed and direction selected to facilitate removal of the burrs;

a second motor to power said de-burring tool spindle; and a controller controlling output of said second motor, wherein the predefined speed of said de-burring tool spindle is programmable through said controller, wherein said de-burring tool spindle is translatable between two or more positions including a first disengaged position with respect to said first end surface and a second engaged position with respect to said first end surface and wherein position translation is programmable through the controller, and wherein the de-burring tool includes a peripheral edge sharpened to shear off and thereby remove some of said burrs, the de-burring tool also including a contact surface extending generally in the direction of the first end surface and configured to grind off and thereby remove others of said burrs.

12. The hobbing machine for cutting gear teeth into a gear blank of claim 11, further comprising:

a second de-burring tool translatable into engagement with a second end surface of the gear blank, said second de-burring tool configured to remove burrs from the second end surface of the gear blank as the gear teeth are being cut by the rotatable cutter; and a spacer adapted to position said second de-burring tool at a predetermined distance from the first de-burring tool, said spacer secured at one end to said powered spindle, said spacer secured at an opposing second end to said second de-burring tool so as to rotate said second de-burring tool in unison with said first de-burring tool, the predetermined distance of said spacer selected such that said second de-burring tool engages the second end surface of the gear blank while said first de-burring tool engages the first end surface to remove burrs from the first end surface and the second end surface of the gear blank.

* * * * *